Dec. 5, 1939.  G. SOLOMON  2,182,648
AIRPLANE
Filed Feb. 28, 1939  2 Sheets-Sheet 1
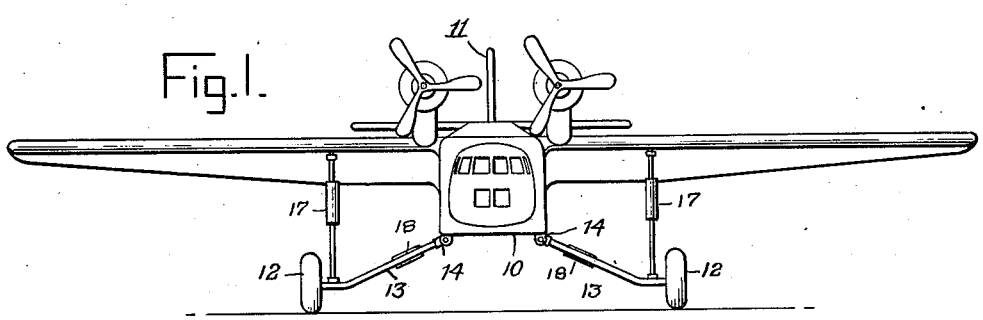
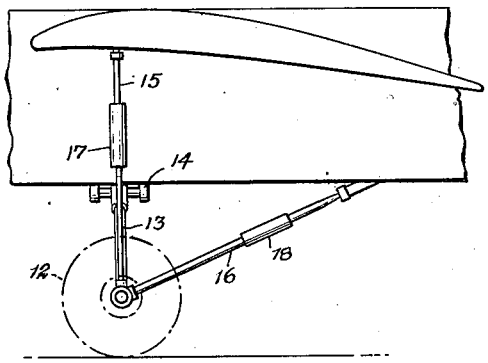
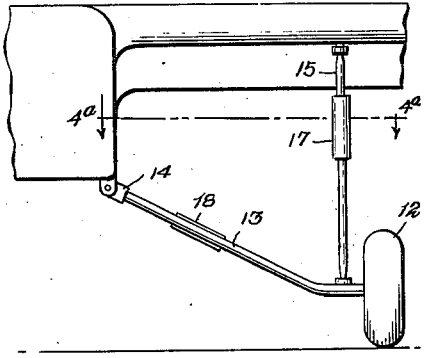
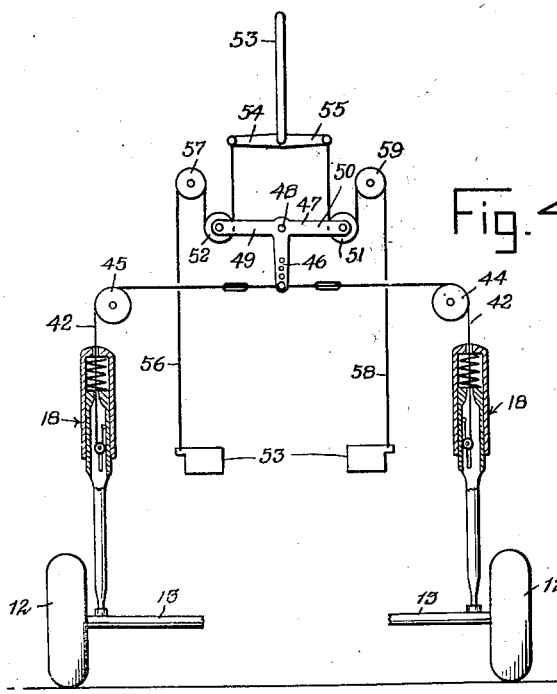
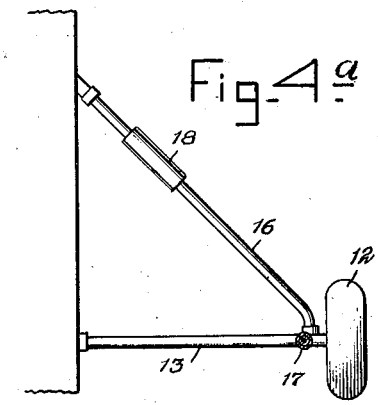
INVENTOR
Guillermo Solomon
BY
Munn, Anderson & Liddy
ATTORNEYS Dec. 5, 1939.   G. SOLOMON   2,182,648
AIRPLANE
Filed Feb. 28, 1939   2 Sheets-Sheet 2
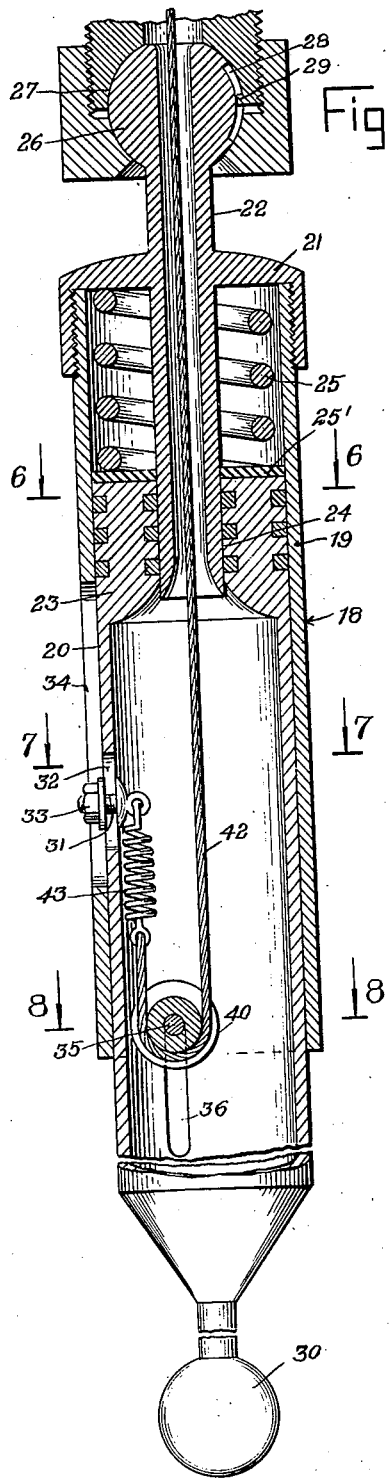
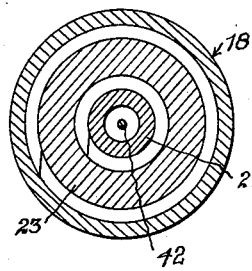
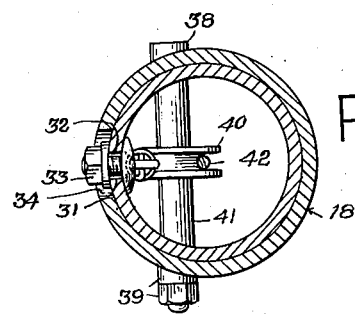
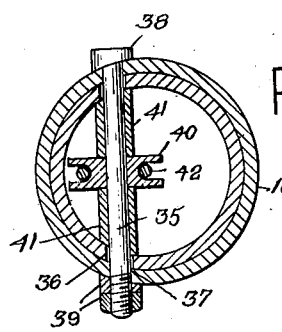
INVENTOR
Guillermo Solomon
BY
Munn, Anderson & Liddy
ATTORNEYS Patented Dec. 5, 1939

2,182,648

UNITED STATES PATENT OFFICE 2,182,648

AIRPLANE

Guillermo Solomon, Santiago, Dominican Republic

Application February 28, 1939, Serial No. 258,883

6 Claims. (Cl. 244—50)

This invention relates to airplanes, and more particularly to automatically controlled rudder moving means.

It is a well known fact that airplanes in landing, taxiing and taking off frequently veer sharply to the right or left due to the fact that one wheel of the front landing gear meets with greater resistance than does the other wheel of the landing gear, and I have discovered that by the use of shock absorbers and the proper arrangement of cables and other mechanism I can utilize this differential in resistance of the wheels of the landing gear to cause the movement of the rudder in a direction to overcome the tendency of a plane to veer sharply from one side to the other.

My invention embodies many novel features of construction and combinations and arrangements of parts all of which will be more fully described and pointed out in the claims.

In the accompanying drawings—

Fig. 1 is a view in front elevation of an airplane embodying my invention;

Fig. 2 is a fragmentary view in side elevation;

Fig. 3 is a view in front elevation of the details shown in Fig. 2;

Fig. 4 is a view partly in elevation, partly in section, but mainly diagrammatic, illustrating my invention;

Fig. 4a is a plan view taken on the line 4a—4a of Fig. 3.

Fig. 5 is a view in longitudinal section through one of the shock absorbers utilized in the landing gear;

Fig. 6 is a view in transverse section on the line 6—6 of Fig. 5;

Fig. 7 is a view in transverse section on the line 7—7 of Fig. 5; and

Fig. 8 is a view in transverse section on the line 8—8 of Fig. 5.

The reference character 10 is employed to indicate an airplane which may be of any form and which is provided with a pivoted rudder 11. 12—12 represents the wheels of the front landing gear. These wheels are mounted on transversely extending axles 13, these axles being connected to the fuselage of the airplane by universal joints illustrated at 14, so that the wheels are capable of up and down movement and front and rear movement.

The outer ends of the axles 13 are each braced by a vertical strut 15 and a diagonal, rearwardly extending strut 16. The construction of these struts is alike at both sides of the plane and the description hereinafter of one set of struts will apply alike to both. The vertical strut 15 is made in two sections connected by a shock absorber 17, and the fore and after diagonal struts comprise two sections connected by a shock absorber 18. It is well within the scope of the present invention to construct these shock absorbers in various ways and to control their operation mechanically, hydraulically, electrically or pneumatically, but for the purposes of my improved rudder controlling mechanism I preferably form the shock absorbers at least in such a way that they operate mechanically, and for details of construction of the shock absorber 18 attention is directed particularly to Figs. 5, 6, 7 and 8 of the drawings.

The shock absorber 18 includes an outer, cylindrical casing 19 having a tubular piston 20 fitting snugly and mounted to move longitudinally in the casing, and this piston extends through the open lower end of the casing as shown. A cap 21 is screwed onto the upper end of the shock absorber and is provided centrally with a tubular stem 22 which projects into the casing as well as above the cap. The head 23 of piston 20 is formed with a central bore 24 receiving the stem 22 and the coil spring 25 is located around the stem and interposed between the cap 21 and the washer 25 on head 23 of piston 20 so as to exert a normal pressure against the piston.

The stem 22 at its upper end is formed with a ball 26 which fits in a socket 27 carried by the rear section of strut 16 and is formed with a slot 28 receiving a projection 29 on the socket member to prevent any turning movement of the ball in the socket. The lower end of piston member 20 is also provided with a ball 30 to be received in a socket on the axles 13 so that while these strut members and shock absorbers have a certain amount of angular movement relative to each other they are held against independent rotary movement.

A small post 31 which constitutes an effective bolt is projected through a slot 32 in the wall of piston 20 and is securely clamped to said wall by a nut 33 on the outside of the piston, and whose movement is accommodated in a slot 34 in cylinder 18. A shaft 35 is projected through slots 36 in opposite sides of piston 20 and is secured in openings 37 in cylinder 18, and one form of shaft 35 may constitute a bolt having a head 38 at one end and a screw thread at its other end to receive clamping nuts 39 shown most clearly in Fig. 8 of the drawings. A pulley 40 is mounted on this shaft 35 and is held centrally on the shaft by spacing sleeves 41 located on the shaft at opposite sides of the pulley.

A flexible connecting device 42 which may constitute a cable or any other improved flexible device, extends through the stem 22, is passed around the pulley 40 and is connected by a coil spring 43 with the post 31. It is to be understood that the upper or rear strut member 18 is of tubular form or hollow, so that the flexible connecting device 42 which will be hereinafter referred to as a cable, extends. I have shown in Fig. 4 this cable 42 as a single member extending from one shock absorber to the other and passed around idle pulleys 44 and 45, but of course it is possible and even probable that there will be separate cables, both being connected to the forwardly extending arm 46 of a T-lever 47. This lever 47 is pivoted at the juncture of its free arms as shown at 48 and its laterally extending arms 49 and 50 carry pulleys 51 and 52, respectively. 53 represents the rudder of the airplane and 54 and 55 are laterally projecting arms extending from opposite sides of the rudder.

A cable 56 is fixedly connected and extends rearwardly and is passed around an idle pulley 57 and then extends forwardly and is passed around the idle pulley 52 and then extends rearwardly and is secured to the arm 54 of the rudder 53. A second cable 58 is secured to the rudder pedal and extends rearwardly and around the idle pulley 59 and then extends forwardly and around the pulley 51 and then rearwardly and is secured to the arm 55 of rudder 53.

As above explained, when a plane runs in landing it frequently happens that one wheel encounters more resistance than the other wheel when such wheel strikes an obstruction or meets with a greater resistance than is imparted to the other wheel. When the airplane is equipped with my invention the rearward movement of one wheel will cause the piston 20 and the cylinder 19 to move relative to each other in a direction to contract the shock absorber against the action of the spring 25. This will cause shaft 35 to move away from the post 31, thus causing a movement of the cable 42 to move the T-lever 47 and consequently move the rudder in a direction to counteract the tendency of the aircraft to suddenly veer to one side or the other as the case may be. Thus the movement of the rudder is controlled by the forward or rearward movement of the wheels of the landing gear and if the resistance to such movement is equal, then the rudder remains straight; but if the resistance to one wheel is greater than to the other, then the rudder will be shifted to counteract the tendency to veer, which would be the result of such different positions of the wheel.

While I have illustrated and described what I believe to be a preferred embodiment of my invention, it is obvious that various changes may be made in the general form and arrangement of parts without departing from the invention, as I do not limit myself to the specific details set forth and consider myself at liberty to make such changes and alterations as clearly fall within the spirit and scope of the appended claims.

I claim:

1. In combination with an airplane, landing wheels connected to the plane and having limited universal movement, of struts operatively connected with the wheels, extending rearwardly therefrom and consisting of sections, shock absorbers between sections, and means operatively connecting the shock absorbers with the rudder of the airplane whereby the movement of the shock absorbers controls the movement of the rudder when the plane is landing, taxiing or taking off.

2. In combination with an airplane, landing wheels connected to the plane and having limited universal movement, of struts operatively connected with the wheels, extending rearwardly therefrom and consisting of sections, shock absorbers between sections, means operatively connecting the shock absorbers with the rudder of the airplane whereby the movement of the shock absorbers controls the movement of the rudder when the plane strikes the ground, said means including a T-lever adapted to swing the rudder, and cables connecting the shock absorber and said lever.

3. In combination with an airplane, movably mounted wheels connected to the plane and constituting parts of the landing gear, rearwardly extending struts operatively connected to the wheels, shock absorbers interposed between sections of the struts, each shock absorber comprising an outer casing and an inner spring-pressed piston, a shaft connected to the casing and extending through slots in the piston, a pulley on said shaft in the piston, a cable secured at one end to the piston and passed around said pulley and projecting out of the casing, and means operatively connecting said cable with the rudder of the aircraft to move the rudder by the forward or rearward movements of the landing wheels.

4. In combination with an airplane, movably mounted wheels connected to the plane and constituting parts of the landing gear, rearwardly extending struts operatively connected to the wheels, shock absorbers interposed between sections of the struts, each shock absorber comprising an outer casing and an inner spring-pressed piston, a shaft connected to the casing and extending through slots in the piston, a pulley on said shaft in the piston, a cable secured at one end to the piston and passed around said pulley and projecting out of the casing, means operatively connecting said cable with the rudder of the aircraft to move the rudder by the forward or rearward movements of the wheels, said casing and piston having ball and socket connection with sections of the struts, and means for preventing rotary movement of the shock absorber or parts of the struts relating to each other.

5. In combination with an airplane, movably mounted wheels connected to the plane and constituting parts of the landing gear, rearwardly extending struts operatively connected to the wheels, shock absorbers interposed between sections of the struts, each shock absorber comprising an outer casing and an inner spring-pressed piston, a shaft connected to the casing and extending through slots in the piston, a pulley on said shaft in the piston, a cable secured at one end to the piston and passed around said pulley and projecting out of the casing, means operatively connecting said cable with the rudder of the aircraft to move the rudder by the forward or rearward movements of the wheels, and a spring interposed between the end of the cable and the fixed part of the piston so as to exert a longitudinal pull on the cable.

6. In an aircraft, in combination with laterally extending axles having limited universal joints connecting them with the fuselage of the aircraft, wheels on the outer ends of said axles, diagonal or fore and aft struts connecting said axles with the fuselage, shock absorbers located between sections of the last-mentioned struts, and flexibly connected devices operatively connected between the last-mentioned shock absorbers and the rudder of the airplane, whereby movement of the shock absorbers causes movement of the rudder.

GUILLERMO SOLOMON.